United States Patent
Tanaka (10) Patent No.: US 9,663,148 B2
(45) Date of Patent: May 30, 2017

(54) VEHICLE SIDE SECTION STRUCTURE

(71) Applicant: TOYOTA JIDOSHA KABUSHIKI KAISHA, Toyota-shi (JP)

(72) Inventor: Ryusuke Tanaka, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/987,904

(22) Filed: Jan. 5, 2016

(65) Prior Publication Data
US 2016/0236719 A1    Aug. 18, 2016

(30) Foreign Application Priority Data
Feb. 13, 2015 (JP) ................. 2015-026880

(51) Int. Cl.
  *B60N 99/00*   (2006.01)
  *B62D 21/15*   (2006.01)
  *B62D 25/04*   (2006.01)
  *B62D 29/00*   (2006.01)

(52) U.S. Cl.
  CPC ........... *B62D 21/157* (2013.01); *B62D 25/04* (2013.01); *B62D 29/007* (2013.01)

(58) Field of Classification Search
  CPC ..... B62D 21/157; B62D 25/04; B62D 29/007
  See application file for complete search history.

(56) References Cited

U.S. PATENT DOCUMENTS

| | | | | |
|---|---|---|---|---|
| 8,894,131 B2 * | 11/2014 | Mori | ............ | B62D 21/157 |
| | | | | 296/193.06 |
| 8,905,464 B2 * | 12/2014 | Gunther | ............ | B62D 25/04 |
| | | | | 296/187.12 |
| 9,156,505 B2 * | 10/2015 | Yao | ............ | B62D 25/04 |
| 2010/0194146 A1 | 8/2010 | Nishimura et al. | | |

FOREIGN PATENT DOCUMENTS

| | | |
|---|---|---|
| JP | 2006-44525 A | 2/2006 |
| JP | 2010-173562 | 8/2010 |
| JP | 2011-79413 A | 4/2011 |
| JP | 2012-116444 A | 6/2012 |

* cited by examiner

*Primary Examiner* — Lori L Lyjak
(74) *Attorney, Agent, or Firm* — Oblon, McClelland, Maier & Neustadt, L.L.P.

(57) ABSTRACT

A vehicle side section structure that includes: a lower reinforcement that configures a lower portion of a vehicle width direction outer side section of a center pillar, that is open toward a vehicle width direction inner side viewed from a vehicle upper side, that has an upper portion disposed adjacent to an inner side of a lower end portion of an outer reinforcement, and that has a lower strength than the outer reinforcement; and an escape portion that is formed at a vehicle width direction outer side wall portion of the lower reinforcement, that is disposed facing a lower end of a vehicle width direction outer side wall portion of the outer reinforcement in the vehicle width direction, and that is separated from, and is at the vehicle width direction inner side of, the lower end.

9 Claims, 6 Drawing Sheets

VEHICLE SIDE SECTION STRUCTURE

CROSS-REFERENCE TO RELATED APPLICATION

This application is based on and claims priority under 35 USC 119 from Japanese Patent Application No. 2015-026880 filed on Feb. 13, 2015, which is incorporated by reference herein.

BACKGROUND

Technical Field

The present disclosure relates to a vehicle side section structure.

Related Art

A center pillar described in Japanese Patent Application Laid-Open (JP-A) No. 2010-173562 has a structure in which a lower end portion of a pillar outer panel overlaps the vehicle width direction outside of an outer panel.

SUMMARY

A vehicle side section structure of a first aspect of the present disclosure includes: outer reinforcement that configures a vehicle width direction outside section of a center pillar, that extends along a vehicle up-down direction, and that is open toward the vehicle width direction inside viewed from the vehicle upper side; lower reinforcement that configures a lower portion of the vehicle width direction outside section of the center pillar, that is open toward the vehicle width direction inside viewed from the vehicle upper side, that has an upper portion disposed adjacent to the inside of a lower end portion of the outer reinforcement, and that is set with a lower strength than the outer reinforcement; and an escape portion that is formed to a vehicle width direction outside wall portion of the lower reinforcement, that is disposed facing a lower end of a vehicle width direction outside wall portion of the outer reinforcement in the vehicle width direction, and that is separated from, and at the vehicle width direction inside of, the lower end.

DESCRIPTION OF EMBODIMENTS

Explanation follows regarding a vehicle side section structure S according to an exemplary embodiment, with reference to the drawings. Note that in the drawings, the arrow FR indicates the vehicle front side, the arrow LH indicates the vehicle left side (one vehicle width direction side), and the arrow UP indicates the vehicle upper side of a vehicle applied with the vehicle side section structure S.

Figure 2:
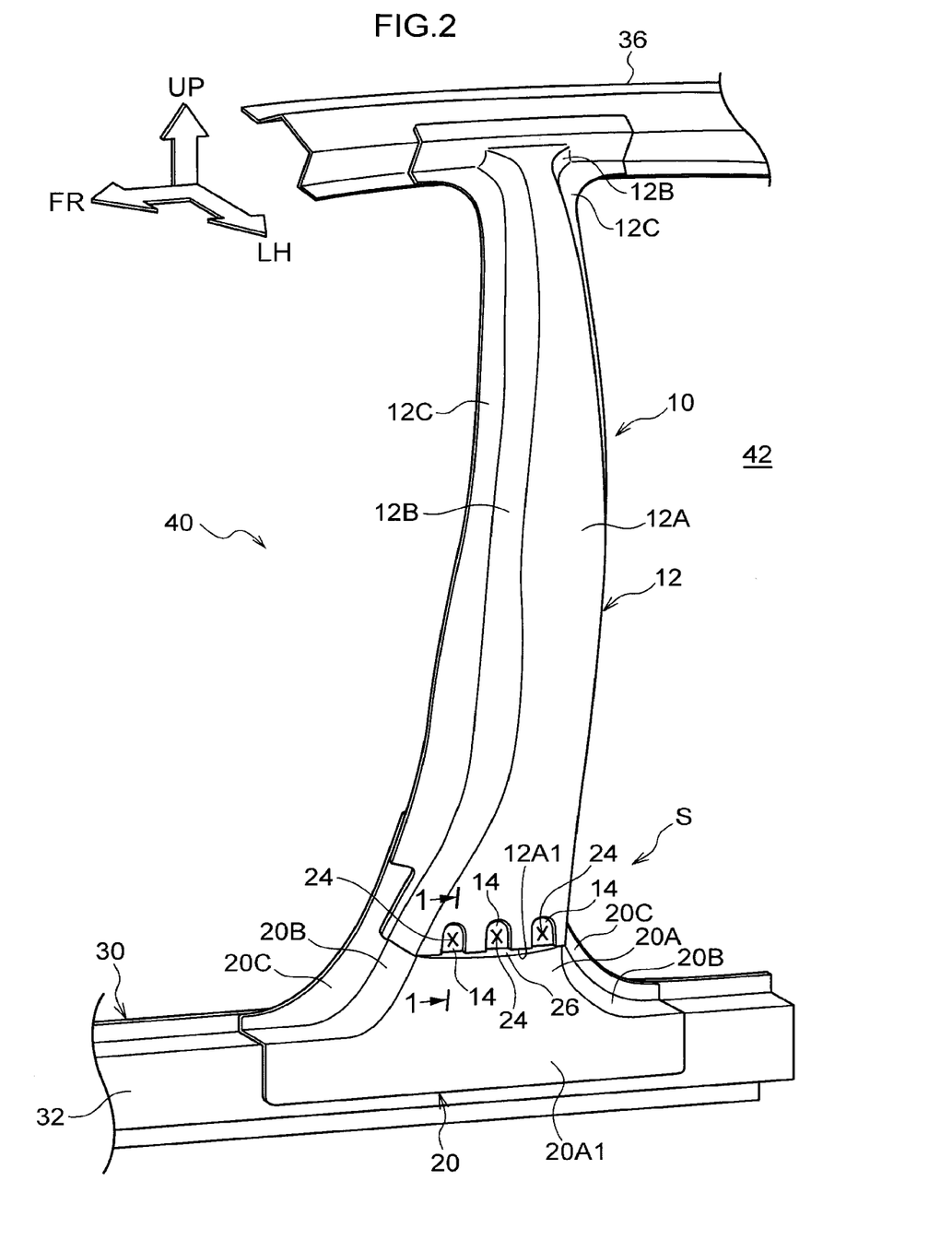
FIG. 2 is a perspective view illustrating the entire pillar outer reinforcement and pillar lower reinforcement illustrated in FIG. 1, viewed diagonally from the vehicle front left side.

As illustrated in FIG. 2, the vehicle side section structure S is applied to center pillars 10 respectively provided at either side of the vehicle (only the center pillar 10 disposed at the vehicle left side is illustrated in FIG. 2). Each center pillar 10 is provided between a front door open section 40 and a rear door open section 42 at either side section of the vehicle, and is configured as a frame member extending along the vehicle up-down direction. The left and right center pillars 10 are configured with left-right symmetry in the vehicle width direction. Thus explanation follows below regarding the center pillar 10 disposed at the side section at the vehicle left side, and explanation regarding the center pillar 10 disposed at the side section at the vehicle right side is omitted.

Figure 3:
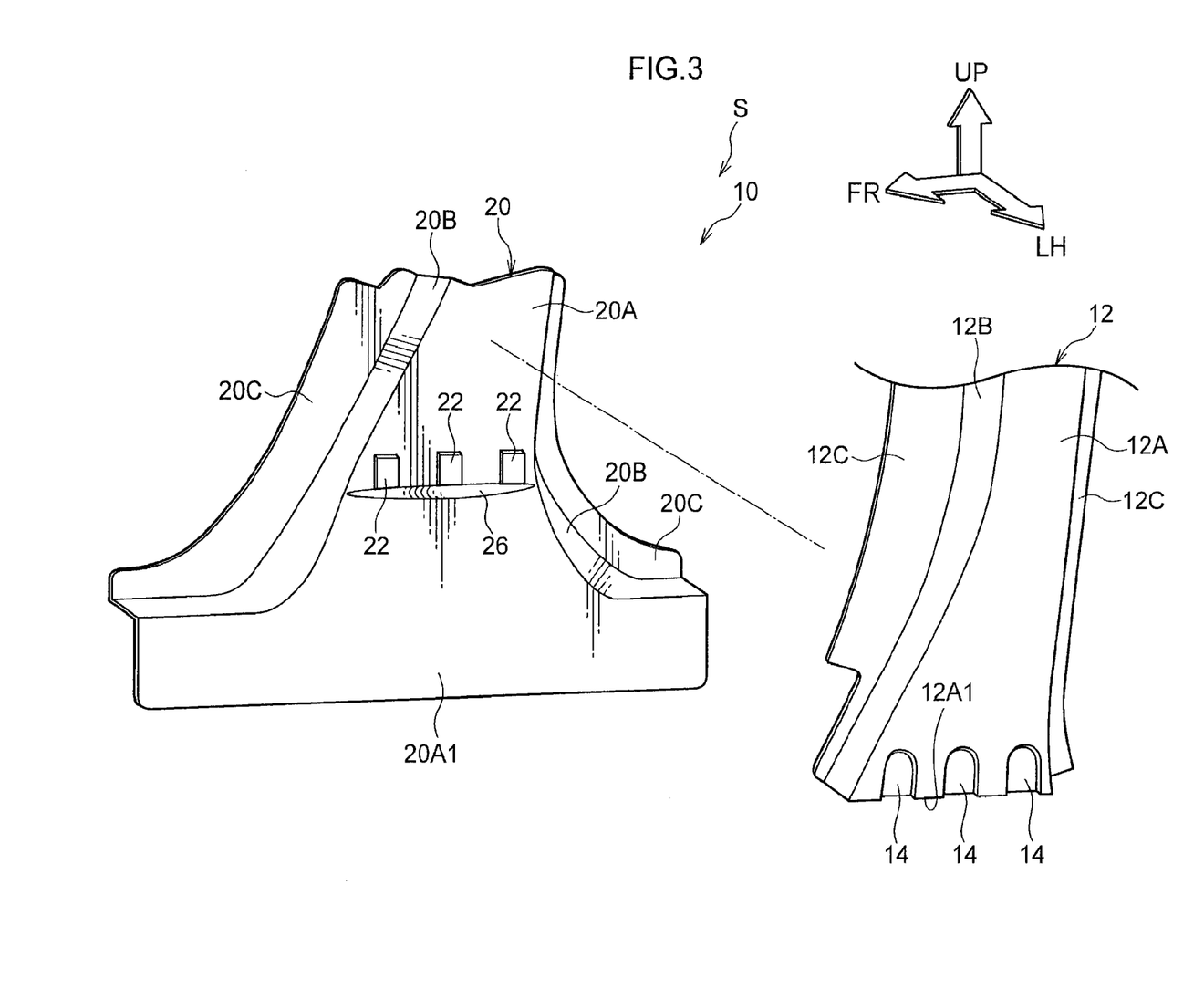
FIG. 3 is a perspective view illustrating enlarged parts of the pillar outer reinforcement and the pillar lower reinforcement illustrated in FIG. 2 in an exploded state, viewed diagonally from the vehicle front left side.

As illustrated in FIG. 3, the center pillar 10 is configured including pillar outer reinforcement 12 serving as "outer reinforcement" configuring a vehicle width direction outside section of the center pillar 10, and pillar lower reinforcement 20 serving as "lower reinforcement" configuring a lower portion of the vehicle width direction outside section of the center pillar 10. Explanation follows regarding the pillar outer reinforcement 12 and the pillar lower reinforcement 20.

The pillar outer reinforcement 12 is manufactured by pressing a high tensile strength steel sheet. Note that the high tensile strength steel sheet is generally a steel sheet with a tensile strength of from 440 Mpa to 790 Mpa; however, this does not exclude super high tensile strength steel sheets with a tensile strength of 980 Mpa or above.

The pillar outer reinforcement 12 extends along the vehicle up-down direction, and is formed with a hat-shaped cross-section open toward the vehicle width direction inside as viewed from the vehicle upper side. Specifically, the pillar outer reinforcement 12 is configured including an outer wall portion 12A serving as a "vehicle width direction outside wall portion" disposed with its plate thickness direction along the vehicle width direction, a pair of side wall portions 12B respectively extending from front and rear ends of the outer wall portion 12A toward the vehicle width direction inside, and a pair of flange portions 12C respectively extending from vehicle width direction inside ends of the pair of side wall portions 12B toward the width direction outsides of the pillar outer reinforcement 12 (the vehicle front-rear direction outsides). A pillar inner panel configuring a vehicle width direction inside section of the center pillar 10 is joined to the pair of flange portions 12C. Note that the pillar inner panel is disposed with its plate thickness direction along the vehicle width direction, and extends along the vehicle up-down direction. The center pillar 10 accordingly has a closed cross-section profile.

As illustrated in FIG. 2, roof side rail outer reinforcement 36 extends along the vehicle front-rear direction at the vehicle upper side of the pillar outer reinforcement 12, and the roof side rail outer reinforcement 36 configures a portion of a roof side rail forming a frame member of the vehicle. The roof side rail outer reinforcement 36 is formed with a substantially hat-shaped cross-section profile open toward substantially the vehicle lower side and vehicle width direction inside viewed along the vehicle front-rear direction. Note that a roof side rail inner panel extends along the vehicle front-rear direction at the vehicle lower side of the roof side rail outer reinforcement 36. The roof side rail inner panel is formed with a substantially hat-shaped cross-section profile open toward substantially the vehicle upper side and vehicle width direction outside viewed along the vehicle front-rear direction, and open end portions of the roof side rail inner panel are joined to open end portions of the roof side rail outer reinforcement 36. The roof side rail is accordingly configured with a closed cross-section profile. An upper end portion of the pillar outer reinforcement 12 (center pillar 10) is joined by welding or the like to the roof side rail outer reinforcement 36.

Figure 1:
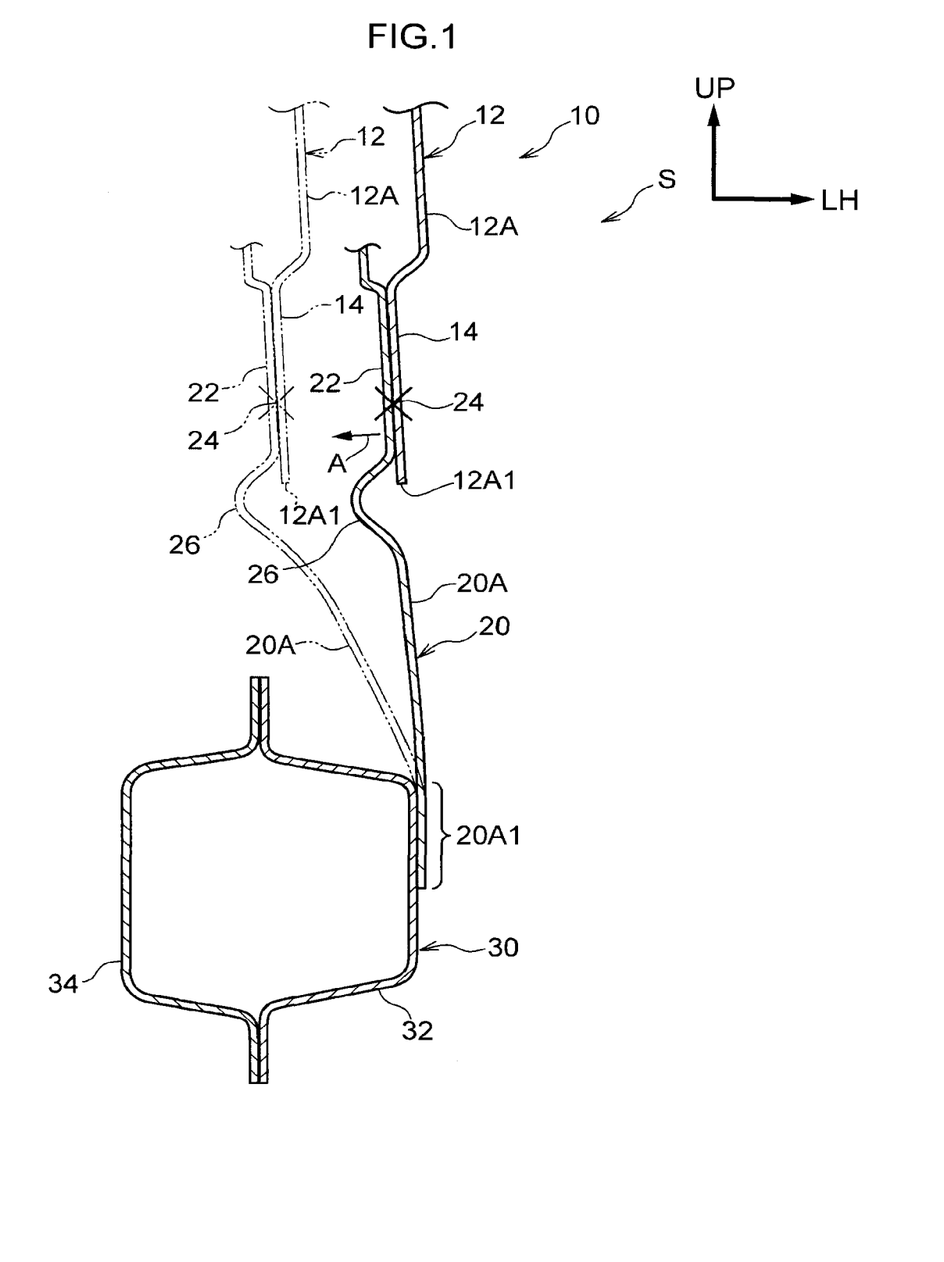
FIG. 1 is a cross-section (an enlarged cross-section along line 1-1 in FIG. 2) illustrating a lower portion of a vehicle width direction outside section of a center pillar of a vehicle applied with a vehicle side section structure according to an exemplary embodiment, viewed from the vehicle front side.

A rocker 30, configuring a frame member of the vehicle, extends along the vehicle front-rear direction at the vehicle lower side of the pillar outer reinforcement 12. As illustrated in FIG. 1, the rocker 30 is configured including rocker outer reinforcement 32 configuring a vehicle width direction outside section of the rocker 30, and rocker inner reinforcement 34 configuring a vehicle width direction inside section of the rocker 30. The rocker outer reinforcement 32 and the rocker inner reinforcement 34 are each formed with a substantially hat-shaped cross-section open in a direction facing each other, and respective open end portions are joined together by welding or the like. The rocker 30 accordingly has a closed cross-section structure. A lower end portion of the pillar outer reinforcement 12 is coupled to the rocker 30 by the pillar lower reinforcement 20, described later.

As illustrated in FIG. 2 and FIG. 3, plural (three in the present exemplary embodiment) concave joint portions 14 (elements that are broadly understood to be "joint portions") to which the pillar lower reinforcement 20, described below, is joined, are formed at a lower end edge portion of the outer wall portion 12A of the pillar outer reinforcement 12. The concave joint portions 14 are disposed in a row at specific intervals along the vehicle front-rear direction. Each concave joint portion 14 is formed in a concave shape projecting out toward the vehicle width direction inside, and is formed in a substantially rectangular plate shape in vehicle side view. A lower end of the outer wall portion 12A of the pillar outer reinforcement 12 configures a lower end 12A1.

The pillar lower reinforcement 20 is disposed at the vehicle lower side of the pillar outer reinforcement 12, and, together with the pillar outer reinforcement 12, configures the vehicle width direction outside section of the center pillar 10. The pillar lower reinforcement 20 is manufactured by pressing a general steel sheet (a steel sheet than has a lower tensile strength than a high tensile strength steel sheet). Namely, configuration is such that the strength of the pillar outer reinforcement 12 is higher than the strength of the pillar lower reinforcement 20. The pillar lower reinforcement 20 is formed with a hat-shaped cross-section open toward the vehicle width direction inside viewed from the vehicle upper side. Specifically, the pillar lower reinforcement 20 is configured including an outer wall portion 20A serving as a "vehicle width direction outside wall portion" disposed with its plate thickness direction along the vehicle width direction, a pair of side wall portions 20B respectively extending from front and rear ends of the outer wall portion 20A toward the vehicle width direction inside, and a pair of flange portions 20C respectively extending from vehicle width direction inside ends of the pair of side wall portions 20B toward the width direction outsides of the pillar outer reinforcement 12 (the vehicle front-rear direction outsides). Upper end portions of the pair of flange portions 20C are adjacent to the vehicle width direction inside of the flange portions 12C of the pillar outer reinforcement 12, and are joined to the flange portions 12C and the pillar inner panel (see FIG. 2).

A width dimension (vehicle front-rear direction dimension) of the pillar lower reinforcement 20 is set so as to increase on progression toward the vehicle lower side. Namely, a lower end portion of the pillar lower reinforcement 20 is formed in a fan shape in vehicle side view. Specifically, the side wall portion 20B disposed at the vehicle front side curves toward the vehicle front side on progression toward the vehicle lower side, and the side wall portion 20B disposed at the vehicle rear side curves toward the vehicle rear side on progression toward the vehicle lower side. A lower end portion of the outer wall portion 20A of the pillar lower reinforcement 20 configures an attachment wall portion 20A1, and the attachment wall portion 20A1 extends along the vehicle front-rear direction. A front end portion and a rear end portion of the attachment wall portion 20A1 are connected to the side wall portions 20B. The attachment wall portion 20A1 of the pillar lower reinforcement 20 is joined by welding or the like to the rocker outer reinforcement 32 of the rocker 30.

An upper portion of the pillar lower reinforcement 20 (specifically, a portion further to the vehicle upper side than a bead portion 26, described later) is disposed adjacent to an inner portion of the lower end portion of the pillar outer reinforcement 12. Specifically, the outer wall portion 20A and the pair of side wall portions 20B at the upper portion of the pillar lower reinforcement 20 are disposed adjacent to the inner portion of the lower end portion of the pillar outer reinforcement 12. The outer wall portion 20A at the upper portion of the pillar lower reinforcement 20 is thereby disposed adjacent to the vehicle width direction inside of the outer wall portion 12A at the lower end portion of the pillar outer reinforcement 12. Plural (three in the present exemplary embodiment) convex joint portions 22 (elements that are broadly understood to be "joint portions") are formed to the upper portion of the pillar lower reinforcement 20, at positions corresponding to the concave joint portions 14 of the pillar outer reinforcement 12, previously described (see FIG. 3). Each convex joint portion 22 projects out toward the vehicle width direction outside, is formed in a substantially rectangular shape in vehicle side view, and is disposed overlapping the respective concave joint portion 14 in the vehicle width direction. The pillar lower reinforcement 20 is joined by spot welding or the like at the locations of the convex joint portions 22 to the concave joint portions 14 of the pillar outer reinforcement 12. The pillar outer reinforcement 12 is accordingly coupled to the rocker 30 by the pillar lower reinforcement 20. Note that joint portions between the convex joint portions 22 and the concave joint portions 14 configure weld portions 24 (see the locations marked with x in FIG. 1 and FIG. 2).

As is also illustrated in FIG. 1, the bead portion 26 serving as an "escape portion" is formed to the outer wall portion 20A of the pillar lower reinforcement 20. The bead portion 26 is formed in a concave shape projecting out toward the vehicle width direction inside with respect to the outer wall portion 20A (specifically, the convex joint portions 22 and the outer wall portion 20A), and is formed running along the width direction of the outer wall portion 20A (the vehicle front-rear direction). Specifically, the bead portion 26 extends along the vehicle front-rear direction from the front end across to the rear end of the outer wall portion 20A, and is formed in a substantially V-shape shape open toward the vehicle width direction outside in cross-section view viewed along the vehicle front-rear direction. The up-down position of the bead portion 26 is set so as to be aligned with the up-down position of the lower end 12A1 of the outer wall portion 12A of the pillar outer reinforcement 12. The lower end 12A1 of the pillar outer reinforcement 12 and the bead portion 26 of the pillar lower reinforcement 20 are accordingly disposed facing each other in the vehicle width direction, and the bead portion 26 is separated from, and at the vehicle width direction inside of, the lower end 12A1 of the pillar outer reinforcement 12 (see FIG. 1). Configuration is thereby such that the lower end 12A1 of the pillar outer reinforcement 12 does not contact the outer wall portion 20A of the pillar lower reinforcement 20. The bead portion 26 is disposed adjacent to the vehicle lower side of the convex joint portions 22 of the pillar lower reinforcement 20. The weld portions 24 between the pillar outer reinforcement 12 and the pillar lower reinforcement 20 previously described are accordingly disposed in close proximity to the vehicle upper side of the bead portion 26.

Note that a side outer panel is provided to the side section of the vehicle, and the center pillar 10 and the rocker 30 are covered from the vehicle width direction outside by the side outer panel.

Explanation follows regarding operation and advantageous effects of the present exemplary embodiment.

In the vehicle side section structure S configured as described above, the vehicle width direction outside section of the center pillar 10 is configured by the pillar outer reinforcement 12 and the pillar lower reinforcement 20. The upper portion of the pillar lower reinforcement 20 is disposed adjacent to the inside of the lower end portion of the pillar outer reinforcement 12, and the pillar outer reinforcement 12 is joined at the locations of the concave joint portions 14 to the convex joint portions 22 of the pillar lower reinforcement 20.

The pillar outer reinforcement 12 is configured of a high tensile strength steel sheet, and the pillar lower reinforcement 20 is configured of a steel sheet. Configuration is thereby such that the strength of the pillar outer reinforcement 12 is higher than the strength of the pillar lower reinforcement 20. The upper end portion of the pillar outer reinforcement 12 is joined to the roof side rail outer reinforcement 36 of the roof side rail, and the lower end portion of the pillar lower reinforcement 20 (attachment wall portion 20A1) is joined to the rocker outer reinforcement 32 of the rocker 30.

Figure 4:
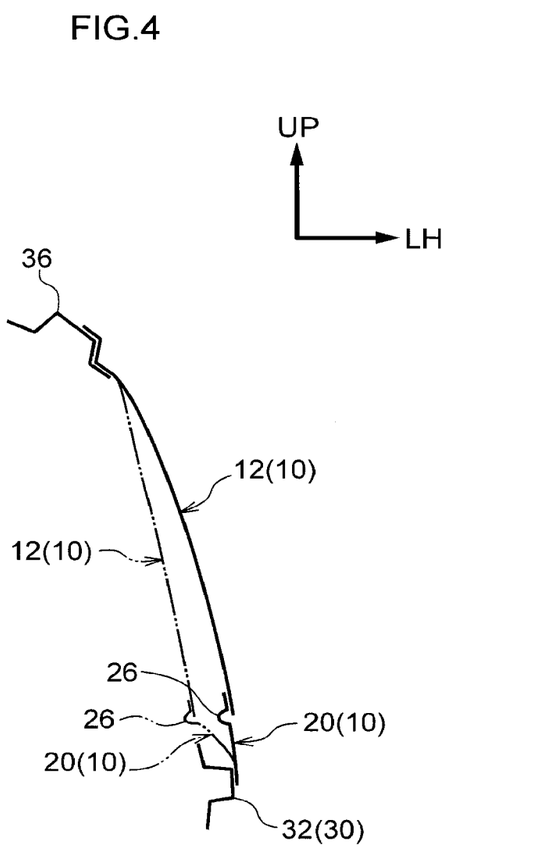
FIG. 4 is an explanatory view for explaining deformation of a center pillar during a vehicle side-on collision, viewed from the vehicle front side.

In a vehicle side-on collision, the center pillar 10 (the pillar outer reinforcement 12 and the pillar lower reinforcement 20) deforms as described below. Namely, in a vehicle side-on collision, collision load toward the vehicle width direction inside is mainly input to a vehicle up-down direction intermediate portion of the center pillar 10. As described above, the upper end portion of the pillar outer reinforcement 12 is joined to the roof side rail outer reinforcement 36, and the lower end portion of the pillar lower reinforcement 20 is joined to the rocker outer reinforcement 32. The strength of the pillar outer reinforcement 12 is configured higher than the strength of the pillar lower reinforcement 20. Thus the lower end portion of the pillar outer reinforcement 12 acts so as to press the upper portion of the pillar lower reinforcement 20 in toward the vehicle width direction inside (see the arrow A in FIG. 1) due to the collision load toward the vehicle width direction inside, and in the center pillar 10, mainly the pillar lower reinforcement 20 that has a lower strength than the pillar outer reinforcement 12 is deformed toward the vehicle width direction inside (see the pillar lower reinforcement 20 illustrated by double-dotted dashed lines in FIG. 1). The center pillar 10 thereby deforms such that a boundary portion between the pillar outer reinforcement 12 and the pillar lower reinforcement 20 forms a bulge toward the vehicle width direction inside (see FIG. 4).

Hypothetically, if the bead portion 26 was omitted from the outer wall portion 20A of the pillar lower reinforcement 20, the lower end 12A1 of the outer wall portion 12A of the pillar outer reinforcement 12 would be disposed adjacent to the vehicle width direction outside of the outer wall portion 20A of the pillar lower reinforcement 20. As a result, when the lower end portion of the pillar outer reinforcement 12 pressed the outer wall portion 20A of the pillar lower reinforcement 20 in toward the vehicle width direction inside during a vehicle side-on collision, and the center pillar 10 deformed toward the vehicle width direction inside, the lower end 12A1 of the pillar outer reinforcement 12 would contact (so as to dig into) the outer wall portion 20A of the pillar lower reinforcement 20. There would accordingly be a possibility of cracks occurring at a contact portion of the outer wall portion 20A of the pillar lower reinforcement 20 with the lower end 12A1 of the pillar outer reinforcement 12. In such cases, there would be a concern that the pillar lower reinforcement 20 could not be stably deformed, and collision load input to the center pillar 10 could not be well absorbed by the center pillar 10 in a vehicle side-on collision.

However, in the present exemplary embodiment, the bead portion 26 is formed to the outer wall portion 20A of the pillar lower reinforcement 20. The bead portion 26 is disposed facing the lower end 12A1 of the pillar outer reinforcement 12 in the vehicle width direction, projects out toward the vehicle width direction inside with respect to the outer wall portion 20A, and is separated from, and at the vehicle width direction inside of, the lower end 12A1 of the pillar outer reinforcement 12. Thus, when the lower end portion of the pillar outer reinforcement 12 presses the outer wall portion 20A of the pillar lower reinforcement 20 in toward the vehicle width direction inside during a vehicle side-on collision, the lower end 12A1 of the pillar outer reinforcement 12 can be suppressed from contacting (digging into) the outer wall portion 20A of the pillar lower reinforcement 20 (see the pillar outer reinforcement 12 and the pillar lower reinforcement 20 illustrated by double-dotted dashed lines in FIG. 1). This enables cracks to be suppressed from occurring in the pillar lower reinforcement 20 due to the lower end 12A1 contacting the pillar lower reinforcement 20. This enables the center pillar 10 to be stably deformed, and enables collision load input to the center pillar 10 to be well absorbed by the center pillar 10 in a vehicle side-on collision.

The weld portions 24, these being the joint portions between the pillar outer reinforcement 12 and the pillar lower reinforcement 20, are disposed in close proximity to the vehicle upper side of the bead portion 26. This enables collision load input to the pillar outer reinforcement 12 in a vehicle side-on collision to be efficiently transmitted to the (bead portion 26 of) the pillar lower reinforcement 20.

The pillar outer reinforcement 12 is manufactured from high tensile strength steel sheet, and the strength of the pillar outer reinforcement 12 is configured higher than the strength of the pillar lower reinforcement 20. As explained above, this enables the pillar lower reinforcement 20 to be deformed such that mainly a lower end portion of the center pillar 10 is displaced toward the vehicle width direction inside during a vehicle side-on collision. Namely, this enables the center pillar 10 to be deformed such that the center pillar 10 is displaced toward the vehicle width direction inside at a position at the vehicle lower side of the upper body of a seated occupant. This enables protection performance with respect to the seated occupant to be increased.

The bead portion 26 is formed in a substantially V-shaped bead shape open toward the vehicle width direction outside. This enables the pillar lower reinforcement 20 to be deformed originating at the bead portion 26 in a vehicle side-on collision. This enables deformation of the center pillar 10 in a vehicle side-on collision to be further stabilized.

Modified Example 1

Figure 5:
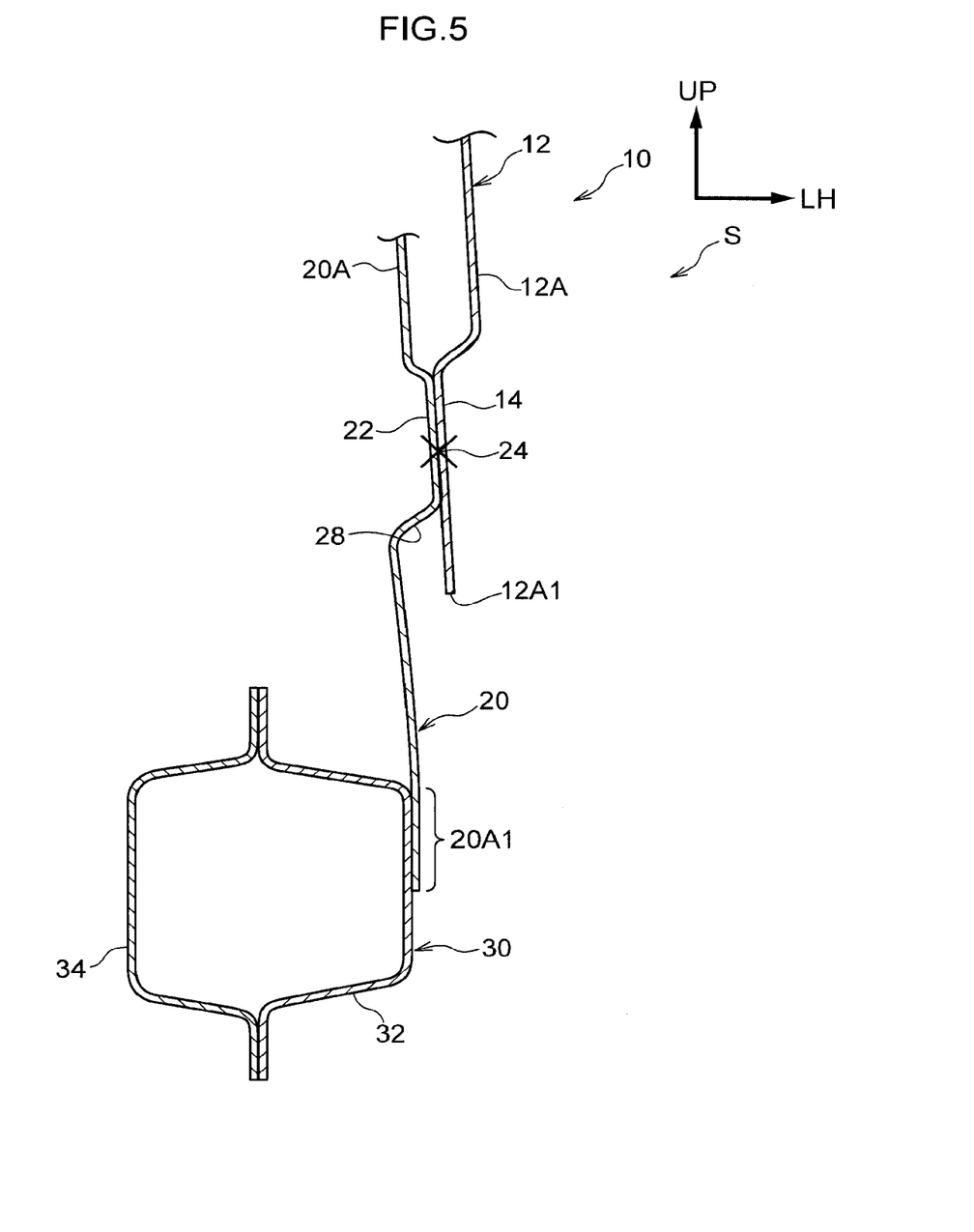
FIG. 5 is a cross-section corresponding to FIG. 1, illustrating a modified example of the pillar lower reinforcement illustrated in FIG. 1.

Explanation follows regarding a modified example 1, with reference to FIG. 5. In the modified example 1, a step portion 28 serving as an "escape portion" is formed to the outer wall portion 20A of the pillar lower reinforcement 20 instead of the bead portion 26 of the present exemplary embodiment. The step portion 28 is disposed at the vehicle lower side of the convex joint portions 22, bends in a step shape toward the vehicle width direction inside, and projects out toward the vehicle width direction inside of the outer wall portion 20A and the convex joint portions 22 in cross-section view viewed along the vehicle front-rear direction. The step portion 28 extends along the vehicle front-rear direction corresponding to a lower end edge portion of the outer wall portion 12A of the pillar outer reinforcement 12. The step portion 28 is thereby disposed separated from, and at the vehicle width direction inside of, the lower end 12A1 of the outer wall portion 12A of the pillar outer reinforcement 12. Thus in the modified example 1, the lower end 12A1 of the outer wall portion 12A of the pillar outer reinforcement 12 can also be suppressed from contacting the pillar lower reinforcement 20 in a vehicle side-on collision.

Modified Example 2

Figure 6:
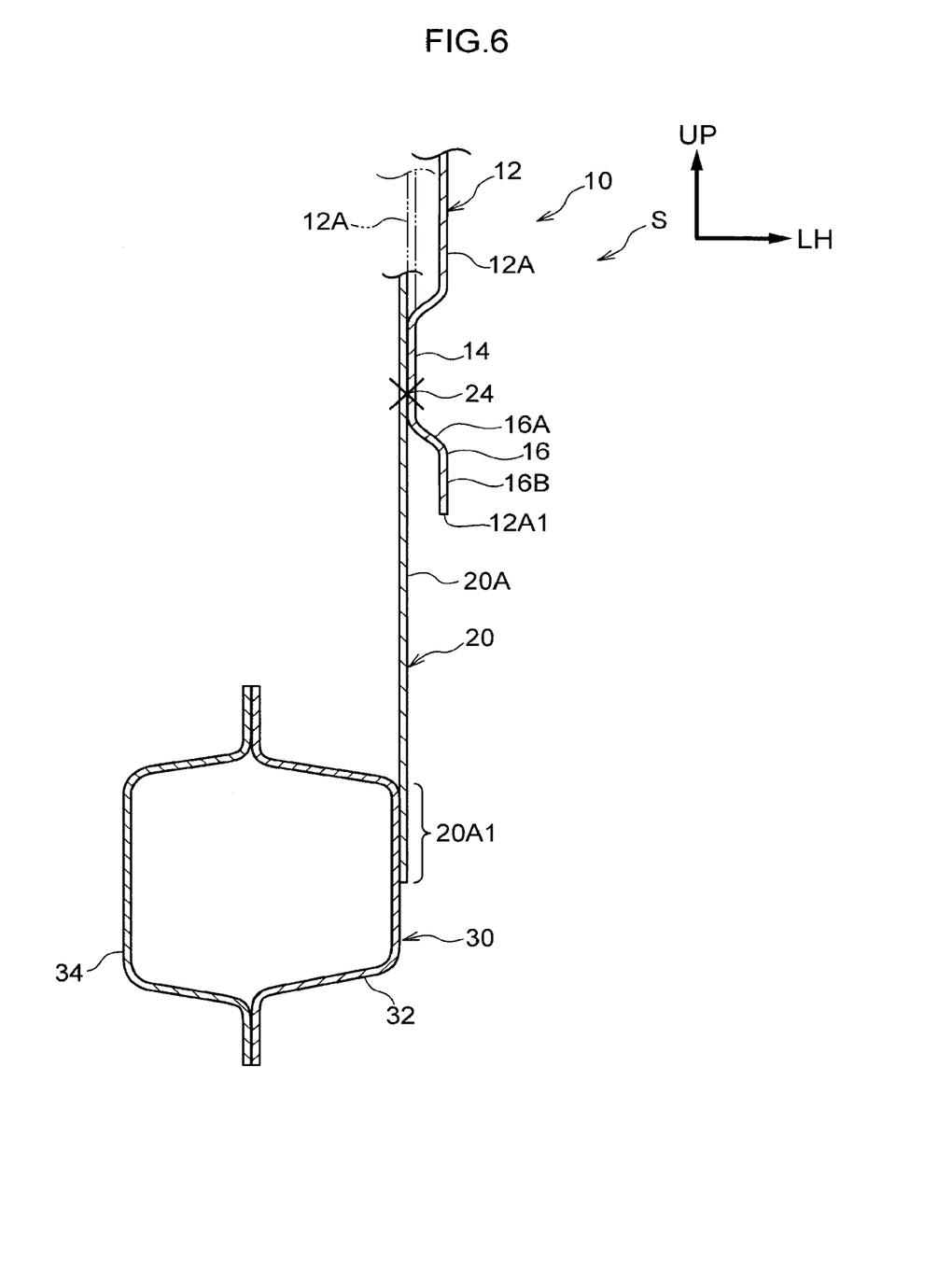
FIG. 6 is a cross-section corresponding to FIG. 1, illustrating another modified example of the pillar outer reinforcement and pillar lower reinforcement illustrated in FIG. 1.

Explanation follows regarding a modified example 2, with reference to FIG. 6. In the modified example 2, the bead portion 26 and the convex joint portions 22 of the present exemplary embodiment are omitted from the outer wall portion 20A of the pillar lower reinforcement 20. Step portions 16, each serving as an "escape portion", are formed at positions corresponding to the concave joint portions 14 at the lower end edge portion of the outer wall portion 12A of the pillar outer reinforcement 12. Each step portion 16 bends in a step shape toward the vehicle width direction outside and projects out toward the vehicle width direction outside with respect to the concave joint portions 14 in cross-section view viewed along the vehicle front-rear direction. Specifically, the step portion 16 is configured including a sloped wall portion 16A sloping toward the vehicle width direction outside on progression from a lower end of the concave joint portion 14 toward the vehicle lower side, and a lower wall portion 16B that extends out from a lower end of the sloped wall portion 16A toward the vehicle lower side. The lower wall portion 16B of the step portion 16 is disposed on the same plane as the outer wall portion 12A of the pillar outer reinforcement 12, which is adjacent in the vehicle front-rear direction. Thus in the modified example 2, the lower end 12A1 of the outer wall portion 12A of the pillar outer reinforcement 12 is also disposed separated from, and at the vehicle width direction outside of, the outer wall portion 20A of the pillar lower reinforcement 20. This enables the lower end 12A1 of the outer wall portion 12A of the pillar outer reinforcement 12 to be suppressed from contacting the outer wall portion 20A of the pillar lower reinforcement 20 in a vehicle side-on collision.

Note that in the modified example 2, the step portions 16 are formed at positions corresponding to the concave joint portions 14. Namely, the step portions 16 are formed intermittently along the width direction of the pillar lower reinforcement 20 (the vehicle front-rear direction). Thus the "escape portion that is formed to a lower end edge portion of a vehicle width direction outside wall portion of the outer reinforcement" of the present disclosure also includes cases in which the escape portion is formed to part of the lower end edge portion of the vehicle width direction outside wall portion of the outer reinforcement.

In the modified example 2, the lower wall portions 16B of the step portions 16 are disposed on the same plane as the outer wall portion 12A of the pillar outer reinforcement 12, which is adjacent in the vehicle front-rear direction; however, the projection height of the lower wall portions 16B with respect to the concave joint portions 14 may be set as desired. For example, the lower wall portions 16B may be disposed at the vehicle width direction inside of the pillar outer reinforcement 12, and disposed separated from, and at the vehicle width direction outside of, the outer wall portion 20A of the pillar lower reinforcement 20.

In the modified example 2, the convex joint portions 22 are omitted from the outer wall portion 20A of the pillar lower reinforcement 20; however, the convex joint portions 22 may be formed to the outer wall portion 20A similarly to in the present exemplary embodiment.

In the modified example 2, the concave joint portions 14 are formed to the pillar outer reinforcement 12, and the step portions 16 are formed at positions corresponding to the concave joint portions 14; however, the concave joint portions 14 of the pillar outer reinforcement 12 may be omitted from the modified example 2. Namely, as illustrated by the double-dotted dashed lines in FIG. 6, configuration may be such that the outer wall portion 12A of the pillar outer reinforcement 12 is disposed adjacent to (overlapping), and at the vehicle width direction outside of, the outer wall portion 20A of the pillar lower reinforcement 20. In such cases, the step portion 16 bends so as to project out toward the vehicle width direction outside with respect to the outer wall portion 12A of the pillar outer reinforcement 12, and is formed running continuously along the vehicle front-rear direction at the lower end edge portion of the pillar outer reinforcement 12. Namely, it is sufficient that the step portion 16 is formed such that the lower end 12A1 of the outer wall portion 12A of the pillar outer reinforcement 12 is disposed separated from, and at the vehicle width direction outside of, the outer wall portion 20A of the pillar lower reinforcement 20, corresponding to a joint mode between the pillar outer reinforcement 12 and the pillar lower reinforcement 20.

In the present exemplary embodiment, the bead portion 26 is formed with a substantially V-shaped cross-section open toward the vehicle width direction outside viewed along the vehicle front-rear direction; however, the cross-section profile of the bead portion 26 is not limited thereto. For example, the cross-section profile of the bead portion 26 may be formed with a substantially U-shape or a circular arc shape open toward the vehicle width direction outside.

In the present exemplary embodiment, the modified example 1, and the modified example 2, the pillar lower reinforcement 20 is disposed so as to overlap the lower end portion of the pillar outer reinforcement 12; however, configuration may be applied in which the upper portion of the pillar lower reinforcement 20 is extended toward the vehicle upper side, and an overlap portion between the pillar lower reinforcement 20 and the pillar outer reinforcement 12 is increased at the vehicle upper side.

As in the present exemplary embodiment, it is desirable that the bead portion 26 extends along the vehicle front-rear direction from the front end across to the rear end of the outer wall portion 20A of the pillar lower reinforcement 20, from the perspective of suppressing cracks from occurring in the outer wall portion 20A of the pillar lower reinforcement 20 in a vehicle side-on collision; however, the bead portion 26 may be set as described below. For example, a front end of the bead portion 26 may be set further to the vehicle rear side than the front end of the outer wall portion 20A of the pillar lower reinforcement 20, and a rear end of the bead portion 26 may be set further to the vehicle front side than the rear end of the outer wall portion 20A of the pillar lower reinforcement 20. Configuration may accordingly be applied such that the front end and rear end of the bead portion 26 do not extend as far as the front end and rear end of the outer wall portion 20A. Namely, since bent ridgelines between the outer wall portion 20A and the side wall portions 20B are formed at the front end and rear end of the outer wall portion 20A, the outer wall portion 20A is configured with relatively high strength in the vicinity of the bend ridgelines. Moreover, stress acting on the pillar lower reinforcement 20 in a vehicle side-on collision is relatively concentrated at a vehicle width direction center portion of the pillar lower reinforcement 20. Cracks can thereby be suppressed from occurring in the outer wall portion 20A of the pillar lower reinforcement 20, even in a configuration in which the bead portion 26 does not extend as far as the bent ridgelines. Thus the "escape portion . . . that is disposed facing a lower end of a vehicle width direction outside wall portion of the outer reinforcement in the vehicle width direction, and that is separated from, and at the vehicle width direction inside of, the lower end" of the present disclosure also includes cases in which the escape portion is separated from, and at the vehicle width direction inside of, a portion of the lower end of the vehicle width direction outside wall portion of the outer reinforcement.

Reinforcement configuring a vehicle width direction outside section of a center pillar is sometimes configured by outer reinforcement extending along the vehicle up-down direction, and lower reinforcement configuring a lower portion of the reinforcement. In such cases, protection performance with respect to a seated occupant can be improved by setting the strength of the outer reinforcement higher than the strength of the lower reinforcement. Namely, since the lower reinforcement with a lower strength mainly deforms in a vehicle side-on collision, the center pillar is displaced toward the vehicle width direction inside at a position that is at the vehicle lower side of the upper body of the seated occupant. This enables protection performance with respect to the seated occupant to be improved.

However, there is a possibility that the issue described below occurs in such cases. Namely, in a vehicle side-on collision, collision load toward the vehicle width direction inside is input to a vehicle up-down direction intermediate section of the center pillar. Normally, an upper end portion of the center pillar is joined to a vehicle roof side rail, and a lower end portion of the center pillar is joined to a vehicle rocker. Thus a lower end portion of the outer reinforcement acts so as to press the lower reinforcement in toward the vehicle width direction inside due to collision load toward the vehicle width direction inside, and the center pillar is deformed such that a boundary portion between the outer reinforcement and the lower reinforcement bulges toward the vehicle width direction inside. When this occurs, there is a possibility that a lower end of the outer reinforcement contacts the lower reinforcement, and that cracks occur in a portion of the lower reinforcement contacted by the lower end. In such cases, the center pillar cannot be stably deformed in a vehicle side-on collision.

In consideration of the above circumstances, an object of the present disclosure is to provide a vehicle side section structure capable of stably deforming a center pillar in a side-on collision.

A vehicle side section structure of a first aspect includes: outer reinforcement that configures a vehicle width direction outside section of a center pillar, that extends along a vehicle up-down direction, and that is open toward the vehicle width direction inside viewed from the vehicle upper side; lower reinforcement that configures a lower portion of the vehicle width direction outside section of the center pillar, that is open toward the vehicle width direction inside viewed from the vehicle upper side, that has an upper portion disposed adjacent to the inside of a lower end portion of the outer reinforcement, and that is set with a lower strength than the outer reinforcement; and an escape portion that is formed to a vehicle width direction outside wall portion of the lower reinforcement, that is disposed facing a lower end of a vehicle width direction outside wall portion of the outer reinforcement in the vehicle width direction, and that is separated from, and at the vehicle width direction inside of, the lower end.

In the vehicle side section structure of the first aspect, the vehicle width direction outside section of the center pillar is configured by the outer reinforcement and the lower reinforcement. The outer reinforcement and the lower reinforcement are open toward the vehicle width direction inside viewed from the vehicle upper side. The outer reinforcement extends along the vehicle up-down direction, and the upper portion of the lower reinforcement is disposed adjacent to the inside of the lower end portion of the outer reinforcement. The lower reinforcement is set with a lower strength than the outer reinforcement. The strength of the outer reinforcement is thereby configured higher than the strength of the lower reinforcement.

Note that the escape portion is formed to the vehicle width direction outside wall portion of the lower reinforcement. The escape portion is disposed facing the lower end of the vehicle width direction outside wall portion of the outer reinforcement in the vehicle width direction, and is separated from, and at the vehicle width direction inside of, the lower end of the outer reinforcement. Thus, when the lower end portion of the outer reinforcement presses the lower reinforcement in toward the vehicle width direction inside due to collision load in a vehicle side-on collision, the lower end of the vehicle width direction outside wall portion of the outer reinforcement is suppressed from contacting the vehicle width direction outside wall portion of the lower reinforcement. This suppresses cracks from occurring in the lower reinforcement due to being contacted by the lower end of the outer reinforcement. This enables the center pillar to be stably deformed in a vehicle side-on collision.

A vehicle side section structure of a second aspect includes: outer reinforcement that configures a vehicle width direction outside section of a center pillar, that extends along a vehicle up-down direction, and that is open toward a vehicle width direction inside viewed from a vehicle upper side; lower reinforcement that configures a lower portion of the vehicle width direction outside section of the center pillar, that is open toward the vehicle width direction inside viewed from the vehicle upper side, that has an upper portion disposed adjacent to the inside of a lower end portion of the outer reinforcement, and that is set with a lower strength than the outer reinforcement; and an escape portion that is formed to a lower end edge portion of a vehicle width direction outside wall portion of the outer reinforcement, and that is separated from, and at the vehicle width direction outside of, a vehicle width direction outside wall portion of the lower reinforcement.

In the vehicle side section structure of the second aspect, the escape portion is formed to the lower end edge portion of the vehicle width direction outside wall portion of the outer reinforcement, and the escape portion is separated from, and at the vehicle width direction outside of, the vehicle width direction outside wall portion of the lower reinforcement. The lower end of the vehicle width direction outside wall portion of the outer reinforcement is accordingly separated from, and at the vehicle width direction outside of, the vehicle width direction outside wall portion of the lower reinforcement. Thus in the second aspect, the lower end of the vehicle width direction outside wall portion of the outer reinforcement is also suppressed from contacting the vehicle width direction outside wall portion of the lower reinforcement in a vehicle side-on collision. This suppresses cracks from occurring in the lower reinforcement due to being contacted by the lower end of the outer reinforcement, thereby enabling the center pillar to be stably deformed in a vehicle side-on collision.

A third aspect is the vehicle side section structure of the first aspect, wherein the escape portion extends along a vehicle front-rear direction, and is formed in a bead shape open toward the vehicle width direction outside in a cross-section view viewed along the vehicle front-rear direction.

In the vehicle side section structure of the third aspect, the escape portion is formed in a bead shape extending along the vehicle front-rear direction, and is open toward the vehicle width direction outside in cross-section view viewed along the vehicle front-rear direction. This enables the lower reinforcement to be deformed originating at the escape portion in a vehicle side-on collision. This enables deformation of the center pillar to be further stabilized.

A fourth aspect is the vehicle side section structure of the first aspect or the second aspect, wherein the escape portion is formed in a step shape in a cross-section view viewed along a vehicle front-rear direction.

In the vehicle side section structure of the fourth aspect, the escape portion is formed in a step shape in cross-section view viewed along the vehicle front-rear direction, thereby enabling contact between the lower end of the vehicle width direction outside wall portion of the outer reinforcement, and the lower reinforcement, to be suppressed using a simple configuration.

The vehicle side section structures of the first aspect and the second aspect enable the center pillar to be stably deformed in a vehicle side-on collision.

The vehicle side section structure of the third aspect enables deformation of the center pillar to be further stabilized.

The vehicle side section structure of the fourth aspect enables contact between the lower end of the vehicle width direction outside wall portion of the outer reinforcement, and the lower reinforcement, to be suppressed using a simple configuration.

The invention claimed is:

1. A vehicle side section structure comprising:
    an outer reinforcement that configures a vehicle width direction outer side section of a center pillar, that extends along a vehicle up-down direction, and that is open toward a vehicle width direction inner side viewed from a vehicle upper side;
    a lower reinforcement that configures a lower portion of the vehicle width direction outer side section of the center pillar, that is open toward the vehicle width direction inner side viewed from the vehicle upper side, that has an upper portion disposed adjacent to an inner side of a lower end portion of the outer reinforcement, and that has a lower strength than the outer reinforcement; and
    an escape portion that is formed at a vehicle width direction outer side wall portion of the lower reinforcement, that is disposed facing a lower end of a vehicle width direction outer side wall portion of the outer reinforcement in the vehicle width direction, and that is separated from, and is at the vehicle width direction inner side of, the lower end.

2. The vehicle side section structure of claim 1, wherein the escape portion extends along a vehicle front-rear direction, and is formed in a bead shape open toward the vehicle width direction outer side section in a cross-section view viewed along the vehicle front-rear direction.

3. The vehicle side section structure of claim 1, wherein the escape portion is formed in a step shape in a cross-section view viewed along a vehicle front-rear direction.

4. The vehicle side section structure of claim 1, wherein:
    an upper end portion of the outer reinforcement is joined to a roof side rail outer reinforcement;
    a lower end portion of the lower reinforcement is joined to a rocker outer reinforcement;
    the roof side rail outer reinforcement extends along a vehicle front-rear direction at the vehicle upper side of the outer reinforcement and configures a portion of a roof side rail forming a vehicle frame member; and
    the rocker outer reinforcement configures a vehicle width direction outer side section of a rocker forming a vehicle frame member extending along the vehicle front-rear direction at a vehicle lower side of the outer reinforcement.

5. The vehicle side section structure of claim 1, wherein:
    the outer reinforcement is manufactured from a high tensile strength steel sheet with a tensile strength of from 440 Mpa to 790 Mpa; and
    the lower reinforcement is manufactured from a steel sheet with a lower tensile strength than the high tensile strength steel sheet.

6. A vehicle side section structure comprising:
    an outer reinforcement that configures a vehicle width direction outer side section of a center pillar, that extends along a vehicle up-down direction, and that is open toward a vehicle width direction inner side viewed from a vehicle upper side;
    a lower reinforcement that configures a lower portion of the vehicle width direction outer side section of the center pillar, that is open toward the vehicle width direction inner side viewed from the vehicle upper side, that has an upper portion disposed adjacent to an inner side of a lower end portion of the outer reinforcement, and that has a lower strength than the outer reinforcement; and
    an escape portion that is formed at a lower end edge portion of a vehicle width direction outer side wall portion of the outer reinforcement, and that is separated from, and is at a vehicle width direction outer side of, a vehicle width direction outer side wall portion of the lower reinforcement.

7. The vehicle side section structure of claim 6, wherein the escape portion is formed in a step shape in a cross-section view viewed along a vehicle front-rear direction.

8. The vehicle side section structure of claim 6, wherein:
an upper end portion of the outer reinforcement is joined to a roof side rail outer reinforcement;
a lower end portion of the lower reinforcement is joined to a rocker outer reinforcement;
the roof side rail outer reinforcement extends along a vehicle front-rear direction at the vehicle upper side of the outer reinforcement and configures a portion of a roof side rail forming a vehicle frame member; and
the rocker outer reinforcement configures a vehicle width direction outer side section of a rocker forming a vehicle frame member extending along the vehicle front-rear direction at a vehicle lower side of the outer reinforcement.

9. The vehicle side section structure of claim 6, wherein:
the outer reinforcement is manufactured from a high tensile strength steel sheet with a tensile strength of from 440 Mpa to 790 Mpa; and
the lower reinforcement is manufactured from a steel sheet with a lower tensile strength than the high tensile strength steel sheet.

\* \* \* \* \*